United States Patent [19]

Hill

[11] Patent Number: 4,661,616

[45] Date of Patent: Apr. 28, 1987

[54] BENZOIC AND BENZACRYLIC ACID ESTERS

[75] Inventor: Michael P. Hill, Saint Lythans, United Kingdom

[73] Assignee: Dow Corning, Ltd., Barry, United Kingdom

[21] Appl. No.: 902,551

[22] Filed: Sep. 2, 1986

Related U.S. Application Data

[62] Division of Ser. No. 638,184, Aug. 6, 1984.

[51] Int. Cl.$^4$ ............................................. C07C 101/00
[52] U.S. Cl. ..................................... 560/050; 560/75; 560/55; 560/67; 556/400
[58] Field of Search ........................... 560/050, 75, 55; 120/67

[56] References Cited

PUBLICATIONS

Kodolov. V. I. et al. Tr. Inst. Khim. Akad. Nauk SSSR. Ural. Filial., No. 15, 15–17, 1968.

Semerneva, G. A. et al. Tr. Inst. Khim. Akad. SSSR. Ural. Filial., No. 15, 19–22, 1968.

Ayubov, G. M. et al. Azerb. Khim. Zh (3), 80–2, 1979.

Kasimova, F. A., Azerb. Khim. Zh(6), 101–5, 1982.

*Primary Examiner*—Paul J. Killos
*Attorney, Agent, or Firm*—George A. Grindahl

[57] ABSTRACT

Compounds represented by the general formula

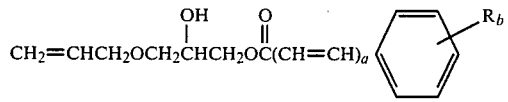

when a and b are each 0 or 1 and R represents OH or lower alkoxy when a is 1, or OH or $-NR'_2$ when a is zero. They can be prepared by the reaction of allyl glycidly ether with the appropriate organic acid e.g. salicylic acid.

Useful as ultra-violet absorbent substances and as intermediates for the preparation of other such substances, for example by polymerization and copolymerization and by reaction with organosilicon compounds having silicon-bonded hydrogen atoms.

3 Claims, No Drawings

BENZOIC AND BENZACRYLIC ACID ESTERS

This is a divisional of co-pending application Ser. No. 638,184 filed on 8/06/84.

This invention relates to organic compounds and to the use of such compounds as ultra violet absorbing substances. The invention also relates to the use of said organic compounds as intermediates in the preparation of other ultra violet absorbing substances.

According to this invention there are provided compounds represented by the general formula

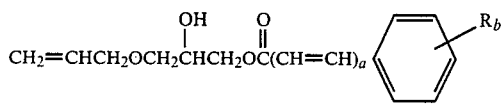

wherein a and b are each 0 or 1 and R when present represents a hydroxy group or an alkoxy group having from 1 to 4 carbon atoms when a is 1, and a hydroxy group or the group $-NR'_2$, in which each $R'$ represents H or an alkyl group having from 1 to 4 inclusive carbon atoms, when a is zero.

The compounds of this invention can be prepared by the reaction of allyl glycidyl ether with the appropriate organic acid. Included within the scope of this invention therefore is a process which comprises reacting together, (A) allyl glycidyl ether and (B) an organic acid represented by the general formula

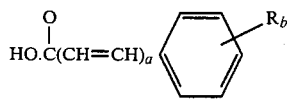

wherein a, b and R are as hereinabove defined.

Reactant (A) is a well-known commercially available material. Reactants (B) are also well-known and readily available and include for example cinnamic acid, methoxy-cinnamic acid, salicylic acid and p-dimethylamino-benzoic acid.

The reaction between (A) and (B) is preferably carried out at elevated temperatures, generally from about 50° C. to the reflux temperature of the reaction mixture. Catalysts may be employed to expedite the reaction. Suitable catalysts are those effective in opening the oxirane ring, for example pyridine, triethylamine, inorganic bases, alkali metal salts and Lewis acids and bases e.g. aluminum acetyl acetonate. Also, if desired, solvents for example toluene, xylene, esters, alcohols and ethers may be employed to facilitate the reaction or assist in the recovery of the reaction product.

Preferably the reaction is performed employing (A) and (B) in stoichiometric proportions. It may however be carried out with either (A) or (B) in stoichiometric excess although excess (A) is generally more easily removed from the reaction mixture when recovering the product.

The compounds of this invention are absorbent to ultra violet radiation and may therefore be incorporated into products e.g. polishes, polymers and paints for reducing or slowing deterioration arising from exposure to such radiation. For absorbtion in the erythemic region (280–320 m$\mu$) the preferred compounds are those wherein R represents an alkoxy group or the group $-NR'_2$ wherein each $R'$ is preferably methyl.

Although they may be advantageously employed per se in formulating various products the compounds of this invention are of particular interest as intermediates. For example they may be reacted via the OH group with acid chlorides e.g. cinnamoyl chloride or p-methoxycinnamoyl chloride to introduce an additional e.g. cinnamic acid residue. They may also be reacted with organosilicon compounds containing $\equiv$SiH groups to produce silanes and siloxanes having both U.V. absorbing properties and the properties associated with organosilicon compounds. For example organosiloxane fluids can be readily formulated into cosmetic preparations such as hand creams and lotions which provide a soft, protective, durable, water-repellent barrier on the skin. In another aspect, therefore, this invention comprises a process for the preparation of U.V. absorbing organosilicon compounds which comprises reacting together (i) a compound represented by the general formula

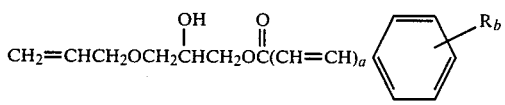

wherein a, b and R are as hereinbefore defined, and (ii) an organosilicon compound having in the molecule at least one silicon-bonded hydrogen atom.

The $\equiv$SiH-containing compound (ii) may be a silane e.g. $CH_3HSiCl_2$, $HSiCl_3$, $(CH_3)_2SiHCl$, $C_6H_5HSiCl_2$, $C_2H_5SiH(OCH_3)_2$ and $(CH_3)_2SiHBr$ but is more preferably an organosiloxane. Examples of organosiloxanes are cyclic methylhydrogen polysiloxanes, trimethylsiloxy end-stopped methylhydrogen polysiloxanes, copolymers of dimethylsiloxane $(CH_3)_2SiO$, methylhydrogensiloxane $(CH_3)HSiO$ and trimethylsiloxane $(CH_3)_3SiO_{\frac{1}{2}}$ units, copolymers of dimethylsiloxane and dimethylhydrogensiloxane $(CH_3)_3HSiO_{\frac{1}{2}}$ units and copolymers of phenylmethylsiloxane, dimethylsiloxane, methylhydrogensiloxane and dimethylphenylsiloxane units. The organic substituents present in (ii) are preferably substantially all methyl groups but other organic substituents such as phenyl, higher alkyl and substituted alkyl groups e.g. halogenoalkyl and carboxyalkyl may also be present if desired, any substituents present in addition to methyl groups and hydrogen atoms preferably constituting no more than about 30% of the total number of substituents.

The reaction between (i) and (ii) may be carried out according to known procedures for the addition of siliconbonded hydrogen atoms to groups containing olefinic unsaturation. Thus the reaction is normally catalysed by the presence of a platinum group metal or compound or complex of a platinum group metal. Examples of catalysts which may be employed for the reaction of (i) and (ii) are platinum on carbon, chloroplatinic acid, platinum acetyl acetonate, complexes of platinum compounds with unsaturated compounds e.g. olefins and vinyl siloxanes, complexes of rhodium or palladium compounds and complexes of platinum and rhodium compounds supported on inorganic substrates (see British Pat. No. 1 527 598). The addition (or hydrosilylation) reaction may be performed at sub-atmospheric, atmospheric or super-atmospheric pressures and in the presence or absence of solvents. It is generally preferred to employ a solvent e.g. toluene or xylene in the reaction between (i) and (ii). It is also preferred to employ elevated temperatures e.g. from about 60° C. up to the reflux temperature of the reaction mixture. When the organosilicon compound (ii) is a halosilane it may be desirable in some cases to protect the OH group in (i), e.g. by protective silylation, during the reaction between (i) and (ii).

The compounds of this invention may also take part in vinyl polymerisation reactions to form homopolymers and copolymers having ultra violet absorbing properties. Such a reaction, may be performed according to known addition polymerisation techniques, for example in the presence of a free radical catalyst e.g. benzoyl peroxide or azo-bis-isobutyronitrile. Copolymers may be formed by including in the reaction mixture comonomers which are susceptible to vinyl copolymerisation, for example vinyl chloride, methyl methacrylate, vinyl silanes, styrene and vinyl acetate.

Organosilicon compounds formed by the hydrosilylation of the compounds of this invention and polymers obtained by vinyl polymerisation and copolymerisation may be employed per se as U.V. absorbents or may be formulated into U.V. absorbing compositions as hereinabove described for the compounds themselves. Where the chemical and physical nature of the products permits, for example as in the vinyl addition copolymers, the products may be fabricated into articles and coating compositions. Thus for example they may be compounded with fillers, curing agents, antioxidants, flame retardants and any other conventional ingredients of such articles and compositions.

The following examples, in which Me represents the methyl group, illustrate the invention.

EXAMPLE 1

Allyl glycidyl ether (38 g, 0.33 mole), p-methoxy cinnamic acid (59.3 g, 0.33 mole) and toluene (93 g) were charged to a 3 neck, 500 ml flask fitted with a thermometer and reflux condenser. An atmosphere of nitrogen was maintained in the flask.

The contents of the flask were heated to reflux and N,N,-dimethylethanolamine (0.4 g) dissolved in toluene (4 g) added to the reaction mixture. After one hour a second addition of N,N-dimethylethanolamine (0.4 g) was made and the reaction mixture maintained at 110°–120° C. for a further 4.5 hours. Gas liquid chromatographic analysis then indicated that the allyl glycidyl ether had been almost totally consumed. When volatiles had been removed by heating at 180° C. under 10 mb a viscous, brown liquid was obtained having the structure

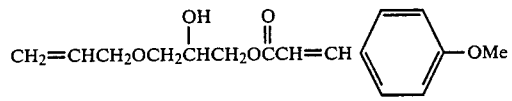

This substance had a λ max of 308 nm and a molar extinction coefficient at this wavelength of 19,000. The extinction coefficient of a 1% by weight solution in methylene chloride was 638.

EXAMPLE 2

Allylglycidyl ether (38 g, 0.33 mole), salicylic acid (46 g, 0.33 mole) and toluene (93 g) were charged to a flask as described in Example 1 and heated to 110° C.

Triethylamine (0.8 g) in toluene (7 g) was added to the reactants and the reaction mixture then maintained at 105°–115° C. for 6 hours. After this time g.l.c. analysis showed that all of the allylglycidyl ether had been consumed.

The reaction mixture was heated to 145° C./10 mb to remove volatiles and yielded a viscous dark red liquid having the structure

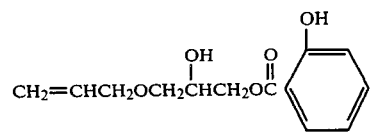

This liquid exhibited a λ max of 306 nm (λ max for salicylic acid = 307 nm) and a molar extinction coefficient at this wavelength of 4420.

EXAMPLE 3

Employing the method described in Example 1 p-amino-benzoic acid (46 g) was reacted with allyl glycidyl ether (38 g) in the presence of toluene (100 g) and triethylamine (0.8 g). After 4 hours the reaction mixture was filtered while hot. The filtrate separated into two clear layers. The lower layer crystallised on cooling and was separated from the upper layer which was shown to be toluene.

EXAMPLE 4

Toluene (5 g) and a complex (0.34 g) of chloroplatinic acid and a vinyl siloxane were placed in a flask and heated to 100° C. to this mixture were then added over a period of 67 minutes (1 ) the reaction product (29.4 g) of allyl glycidyl ether and p-methoxycinnamic prepared as Example 1, (2) toluene (70 g) and (3) (Me$_3$SiO)$_2$SiMeH (24.4 g). The reaction mixture was maintained at 100° C. for 22 hours and a second portion of the platinum complex (0.34 g) then added. After a further 5 hours the toluene was removed by distillation to leave the organosilicon addition product having the following absorption characteristics: λ max 310 nm; molar extinction coefficient 19050.

That which is claimed is:

1. Compounds represented by the general formula

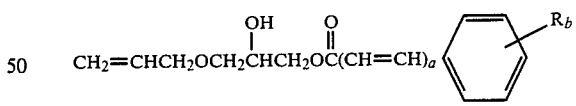

wherein a and b are each 0 or 1 and R when present is selected from the hydroxyl group and alkoxy groups having from 1 to 4 carbon atoms when a is 1, and is selected from the hydroxyl group and the —NR'$_2$ group, in which each R' is selected from hydrogen atoms and alkyl groups having from 1 to 4 inclusive carbon atoms, when a is zero.

2. Compounds as claimed in claim 1 wherein a is 1, b is 1 and R is an alkoxy group having from 1 to 4 carbon atoms.

3. Compounds as claimed in claim 1 wherein a is 0, b is 1 and R represents the —NR'$_2$ group.

* * * * *